United States Patent [19]

Huffman et al.

[11] 4,026,663
[45] May 31, 1977

[54] POLYESTER FABRIC DYED WITH MONOAZO DYESTUFFS

[75] Inventors: Allan M. Huffman, Lock Haven, Pa.; Anatole Wowk, Edison, N.J.

[73] Assignee: American Color & Chemical Corporation, Charlotte, N.C.

[22] Filed: Feb. 5, 1975

[21] Appl. No.: 547,268

[52] U.S. Cl. .................................. 8/41 C; 8/179; 8/DIG. 4
[51] Int. Cl.² .................. C09B 27/00; D06P 1/02
[58] Field of Search ............... 8/41 C, 179, DIG. 4

[56] References Cited

UNITED STATES PATENTS 2,346,013  4/1964  Dickey ........................... 260/205

FOREIGN PATENTS OR APPLICATIONS 1,350,005  12/1963  France
787,069  9/1935  France
138,695  9/1973  Netherlands
46,359  8/1939  Netherlands

*Primary Examiner*—Joseph L. Schofer
*Assistant Examiner*—A. L. Clingman
*Attorney, Agent, or Firm*—Armstrong, Nikaido & Marmelstein

[57] ABSTRACT

Polyester fabric is dyed with azo dyes made by coupling an appropriate diazotized aminobenzene into a coupler prepared by reacting 2-chloroacetylchloride or 3-chloropropionylchloride with 2 moles of N-alkyl, N-cyanoalkyl, or N-benzyl-substituted aminobenzene. This class of azo dyes, when appropriately dispersed, produces dyeings on aromatic polyester fabrics with excellent substantivity, outstanding sublimation fastness, and good fastness to light. The dyes are applied to polyesters, such as polyethylene terephthalate, by carrier dyeing, pressure dyeing, and thermofixation methods.

6 Claims, No Drawings

POLYESTER FABRIC DYED WITH MONOAZO DYESTUFFS

BACKGROUND OF THE INVENTION

Among the polyester fibers, those based on polyethylene terephthalate continue to be the most important, although fibers based on 1,4-dimethylenecyclohexane terephthalate have become commercially available. Developments in both homo- and copolyesters have continued and many modified versions of polyethylene terephthalate have recently appeared on the market. With the advent of new fibers, the search has continued for dyes which build up on the various types of polyester fabric proportionate to the amount of the dye applied, and which are characterized by good light and excellent sublimation properties.

In polyethylene terephthalate fibers, the diffusion of the dye into the fiber is effectively controlled by the mobility of the chain molecules in the disordered regions. However, the molecular shape and the size of the dye, the presence of polar groups and general steric considerations are also important in relation to the rate of diffusion.

We have discovered that certain water insoluble azo dyes diffuse well into the now available polyester fibers. These dyes can be applied by any of the standard methods and the resulting dyeings are characterized by good light fastness and outstanding sublimation properties.

Dyes bearing general structure similarity to those of the present invention were first disclosed by Joseph B. Dickey in U.S. Pat. No. 2,346,013 as colors for cellulose, wool and silk. Structurally similar dyes, described as colorants for polyester, cellulose acetate, polyamide and polyalkenes are described in Dutch Patent 138,695. None of the dyes described in the Dutch Patent can be made using the coupler of the dyes of the present invention.

SUMMARY OF THE INVENTION

In accordance with the invention there is provided polyester textile material dyed with a dye of the formula:

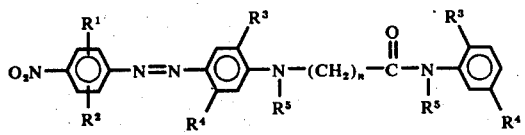

in which:
$R^1$ = hydrogen, lower alkyl, chlorine, bromine, cyano, or nitro;
$R^2$ = hydrogen, lower alkoxy, lower alkyl, chlorine, bromine, or cyano;
$R^3$ = hydrogen, lower alkoxy, lower alkyl, or chlorine;
$R^4$ = hydrogen, lower alkoxy, lower alkyl, or $-NHCOR^6$ where $R^6$ = lower alkyl or phenyl;
$R^5$ = lower alkyl, cyano lower alkyl or benzyl; and
$n$ = 1 or 2.

The dyes are applied by carrier dyeing, pressure dyeing and thermofixation, using standard methods to provide polyester fabric dyed in a variety of colors, ranging from yellow to bluish red, and characterized by excellent properties.

DETAILED DESCRIPTION OF THE INVENTION

The dyes of the above formula are made in the conventional manner by adding a diazotized aminobenzene to a solution of an appropriate coupling component. Typical aminobenzenes useful as the diazotizable base in the coupling reaction are aniline, o-, m-, or p-phenetidine, o-, m-, or p-aminobenzonitrile, 2,4-dichloroaniline, 2,5-dichloroaniline, p-bromoaniline, m- or p-nitroaniline, 4-nitro-o-toluidine, 2-chloro-4-nitroaniline, 3-chloro-4-nitroaniline, 2,6-dichloro-4-nitroaniline; 2-amino-5-nitrobenzonitrile, 4-nitro-o-anisidine, 4-nitro-o-phenetidine, 2,4-dinitroaniline, 6-chloro-2,4-dinitroaniline, 6-bromo-2,4-dinitroaniline, and 2-amino-3,5-dinitrobenzonitrile.

The aminobenzene intermediate is diazotized in the usual way by heating it in an aqueous solution of strong mineral acid such as hydrochloric acid, cooling the resulting solution to a temperature of 0°–10° C. and adding thereto a quantity of sodium nitrite slightly in excess of the stoichiometric requirement. An alternate method of diazotization involves dissolving sodium nitrite in concentrated sulfuric acid, heating to a temperature of about 60°–70° C., cooling the resulting solution to 0°–10° C. and adding thereto the aminobenzene.

Couplers useful in preparing the dyes are made by the reaction of 2-chloroacetylchloride or 3-chloropropionylchloride with an N-alkyl, N-cyanoalkyl, or N-benzyl-substituted arylamine of the formula:

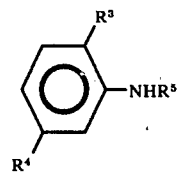

in which:
$R^3$, $R^4$ and $R^5$ have the meanings given above.

The reaction with the chloroalkanoyl chloride is suitably run in an aromatic solvent such as toluene or trichlorobenzene. In order to promote rapid reaction the reaction mixture is usually heated under reflux conditions. The reaction is generally complete within about 24 hours. After cooling the product is filtered off and washed with acetone and then with water and aqueous acetic acid.

The azo dyestuffs used in the invention are made by the reaction of the diazotized aminobenzene with the coupler by adding the diazonium salt to a cold aqueous acidic solution of the coupler. A buffering agent, such as sodium acetate is added to reduce the acidity to a pH of 5 to 7. The mixture is allowed to react for 3 – 16 hours at room temperature and is thereafter filtered and washed acid free. The desired azo product is thus obtained in the form of a wet cake.

To prepare the product for application to the polyester substrates noted hereabove, it must be suitably dispersed. This may be done by any of the several well-known methods: milling as in a ball-mill with dispersing agents such as lignin sulfonic acid materials, for instance. The resultant aqueous dispersion can be dried, as in a spraydryer, or preserved and used as a paste. Standardization to any desired lower strength can be done with inert colorless diluents such as inorganic salts for powders, or water for pastes. Other marterials such as preservatives, foam-control agents, and wetting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste is usually set to be from 10 to 40% of the monoazo compound.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25-60 percent by weight of color content (pure color).

The dye, when added to water with or without auxiliary agents, forms a near colloidal aqueous dispersion from which the aromatic polyester fiber or textile material is dyed in the conventional manner at 40°–100° C. (104°–212° F.) to give a colored fiber containing about 0.01–2 percent by weight dye (100% color basis).

Alternatively, dyeing may be accomplished without a carrier at temperatures of 100°–150° C. under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220° C. (356°–428° F.) are used for 30 to 90 seconds. If the fabric contains cotton or viscose rayon, apart from synthetic fibers, there is little danger of damaging cellulosic portions, but if wool is present, the temperature must be kept within 180°–200° C. and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

Our invention is further illustrated by the following examples:

EXAMPLE 1

A dye of the formula:

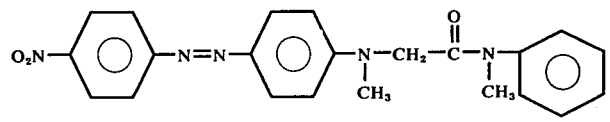

was prepared as follows:

A. Diazonium solution

Into a beaker was placed 200 ml. of water, 55 g. of 32% hydrochloric acid and 27.6 g. of p-nitroaniline. The mixture was iced to 0° C and diazotized by addition of 14.4 g. of sodium nitrite dissolved in 40 ml. of water. The diazotized mixture was stirred ½ hour and then the excess nitrite was destroyed with sulfamic acid.

B. Coupler Solution

A flask fitted with a stirrer and condenser was charged with 226 g. of N-methylaniline, 226 g. of toluene and 56.5 g. of chloroacetyl chloride. The mixture was heated at reflux for 21 hours and then cooled to room temperature. The reaction mass was then diluted with 240 g. of acetone. The solids were filtered off and washed with 195 g. of acetone. The combined filtrate and wash was poured into a separatory funnel and washed in turn with 100 ml. of water, 100 ml. of 50% aqueous acetic acid and 100 ml. of 25% aqueous acetic acid. The washed organic phase was dried using 140 g. of anhydrous potassium carbonate. The carbonate was removed by filtration and the filtrate was stripped of volatiles to a final temperature of 126° C. at 10 mm. Hg. The product, 2-(N-methylanilino)-N-methylacetanilide, was a residual oil which solidified on cooling. Yield, 94 g.

C. Coupling

The coupler was prepared by mixing 65 g. of the coupler prepared above, 60 ml. of water and 60 ml. of 32% hydrochloric acid. The mixture was heated to 75° C. and then cooled to room temperature by the addition of ice.

The coupler mixture was then added to the diazo mixture and allowed to stir 1 hour. The pH was then adjusted to 2.9 by addition of 15 g. of sodium acetate. The slurry was stirred 2½ hours, filtered, and the filter cake dried. Yield: 86 g.

D. Dispersion

The 86 g. of dry cake was dispersed in a sand mill by grinding the 86 g. of color with 86 g. of a lignin sulfonic acid (Lignosol D-10, a commercially available dispersing agent), 170 ml. of water and 170 ml. of sand.

Milling was continued until a suitable dispersion had been achieved as shown by filtration tests. The resulting disperse paste contained 25% by weight of the azo product of Part C.

EXAMPLE 2

An aqueous dye bath containing 10% Marcron L (a commercially available phenolic dye carrier) and 1% monosodium phosphate as a buffering agent was prepared. Type 54 "Dacron" polyester fabric was treated in a bath at 120° C. for 10 minutes, the fabric-to-water dye bath ratio being 1:40. The disperse dye made as described in Example 1 was added in an amount sufficient to provide a bath containing 0.4% dye based on the weight of polyester fibers. Dyeing was continued for one hour at 205° F. and the fabric was removed from the bath, rinsed and dried. Sample dyeings were tested for sublimation according to standard AATCC Color Fastness to to Dry Heat (sublimation) Test No. 117-1974T, p. 119 of the 1974 Technical Manual of the American Association of Textile Chemists and Colorists. Dyed fabric was placed between a sandwich of undyed "Dacron" polyester fabric and heat was applied for 30 seconds. Sublimation tests were made at 350° F. and 400° F. on goods as described above. The dyeing was characterized by bright yellowish red hue. Sublimation tests showed very little transfer of color, even at 400° F.

Similar excellent results were obtained when the dye was applied to the fabric by thermofixation methods and then tested for sublimation as described above.

The coupler mixture was prepared by stirring together 33.6 g. of the above coupler, 30 ml. of water and 30 ml. of 32% hydrochloric acid.

The coupler solution was added to the diazo at 0°-5° C over 5 minutes. The pH of the coupling slurry was then adjusted to 2.1 by the addition of 25 g. of sodium acetate. After stirring overnight at room temperature, the slurry was filtered and the filter cake dried. Yield: 45 g.

D. Dispersion

The 45 g. of dry dye was dispersed as in Example I and dyed on polyester. The shade was a bright red. Sublimation was excellent. Lightfastness was excellent.

EXAMPLE 4

A dye of the formula:

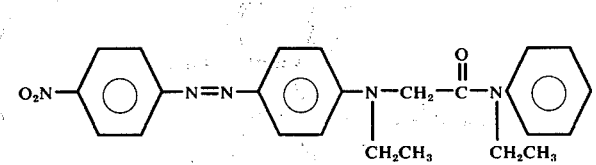

The dyeings were also tested for light fastness by subjecting them to carbon arc fading in accordance with AATCC Color Fastness to Light Carbon Arc Lamp, Continuous Light Test No. 16A-1974, as detailed on p. 124, of the 1974 Technical Manual of the AATCC. The dyeings showed only a very slight break at 20 hours' exposure, indicating excellent fastness to light.

EXAMPLE 3

A dye of the formula:

was prepared as follows:
A. Diazonium solution
The procedure of Example 1 was followed.
B. Coupler Solution
The procedure of Example 1 was followed, except that an equivalent N-ethylaniline was substituted for the N-methylaniline. The yield was similar to that obtained in Example 1.
C. Coupling
The presence of Example 1 was followed by substituting the coupler prepared from N-ethylaniline above.

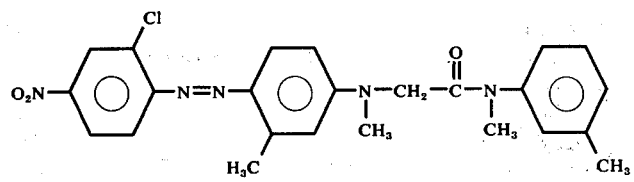

was prepared as follows:
A. Diazonium Solution
The diazo mixture was prepared by heating a mixture of 40 g. of water, 40 of 32% hydrochloric acid and 17.3 g. of o-chloro-p-nitroaniline at 70° C and then drowning into 200 g. of ice and 100 ml. of water. Then 7.2 of sodium nitrite in 25 ml. of water was added. The diazo mixture was stirred for 1 hour with excess nitrite and then the excess nitrite was destroyed by the addition of sulfamic acid.
B. Coupler Solution
A flask fitted as in Example I was charged with 284 g. of N-methyl-m-toluidine, 260 ml. of toluene and 56.6 g. of chloroacetyl chloride. The mixture was stirred and refluxed for 24 hours. The mixture was cooled and treated as the coupler in Example I. Yield: 118.5 g. of 2-(N-methyl-m-toluidino)-N-methyl-m-acetotoluide.
C. Coupling The yield was 84 g.
D. Dispersion
The dye was dispersed as in Example 1.

EXAMPLE 5

The procedure of Example 2 was followed. The dyeing on "Dacron" polyester fabric was a bright yellowish red blue, very similar in shade to that of Example 2. Sublimation tests at 400° F showed very little transfer of color. Light fastness and other evaluations were similar to the dye prepared in Example 1.

EXAMPLES 6-13

Other couplers were prepared by the method of Example 1. The following table lists the chloro alkyl acid chloride, the amine used to make the coupler, the amine that was diazotized, shade on polyester, sublimation and light-fastness.

TABLE I

| EXAMPLE | Chloro alkyl Acid Chloride | Amine used for Coupler | Diazotized Amine | Shade on Polyester | Light-Fastness | Sublimation Fastness |
|---|---|---|---|---|---|---|
| 6 | ClCH$_2$C(O)—Cl | phenyl-NH(CH$_3$) | O$_2$N-phenyl(CN)-NH$_2$ | Red | Excellent | Excellent |
| 7 | ClCH$_2$CH$_2$C(O)—Cl | Cl-phenyl-NH(CH$_3$) | O$_2$N-phenyl(Cl,Cl)-NH$_2$ | Red-Brown | Excellent | Excellent |
| 8 | ClCH$_2$C(O)—Cl | OCH$_3$-phenyl-NH(C$_2$H$_5$) | O$_2$N-phenyl-NH$_2$ | Red | Excellent | Excellent |
| 9 | ClCH$_2$C(O)—Cl | CH$_3$-phenyl-NH(CH$_2$CH$_2$-ON) | O$_2$N-phenyl(NO$_2$,Br)-NH$_2$ | Bluish Red | Excellent | Excellent |
| 10 | ClCH$_2$C(O)—Cl | phenyl(NHCOCH$_3$)-NH(Et) | O$_2$N-phenyl(NO$_2$,Br)-NH$_2$ | Bluish Red | Excellent | Excellent |
| 11 | ClCH$_2$C(O)—Cl | phenyl-NH(CH$_2$C$_6$H$_5$) | O$_2$N-phenyl-NH$_2$ | Yellowish Red | Excellent | Excellent |
| 12 | ClCH$_2$CH$_2$C(O)—Cl | phenyl(NHCOC$_6$H$_5$)-NH(C$_2$H$_5$) | O$_2$N-phenyl(NO$_2$)-NH$_2$ | Bluish Red | Excellent | Excellent |
| 13 | ClCH$_2$C(O)—Cl | CH$_3$-phenyl-NH(C$_2$H$_5$) | O$_2$N-phenyl(CH$_3$)-NH$_2$ | Red | Excellent | Excellent |

We claim:
1. Polyester textile material dyed with a dye of the formula:

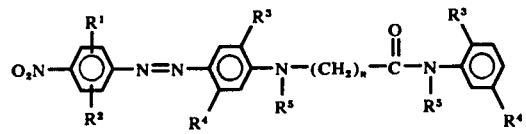

in which R$^1$ is a member selected from the group consisting of hydrogen, lower alkyl, chlorine, bromine, cyano and nitro; R$^2$ is a member selected from the group consisting of hydrogen, lower alkoxy, lower alkyl, chlorine, bromine and cyano; R$^3$ is a member selected from the group consisting of hydrogen, lower alkoxy, lower alkyl, and chlorine; R$^4$ is a member selected from the group consisting of hydrogen, lower alkoxy, lower alkyl and —NHCOR$^6$ in which R$^6$ is lower alkyl or phenyl; R$^5$ is a member selected from the group consisting of lower alkyl, cyano lower alkyl and benzyl; and n has a value of 1 or 2.

2. Polyester textile material dyed with a dye of claim 1 having the formula:

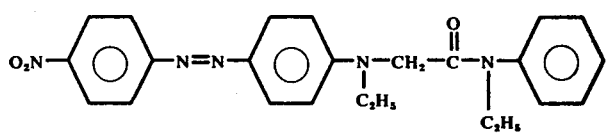

3. Polyester textile material dyed with a dye of claim 1 having the formula:
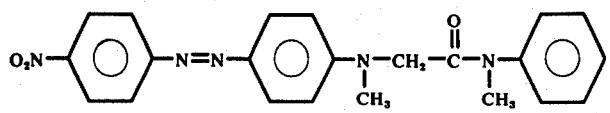
4. Polyester textile material dyed with a dye of claim 1 having the formula:
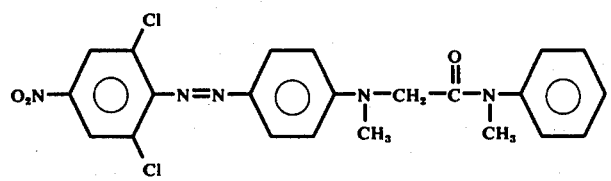
5. Polyester textile material dyed with a dye of claim 1 having the formula:
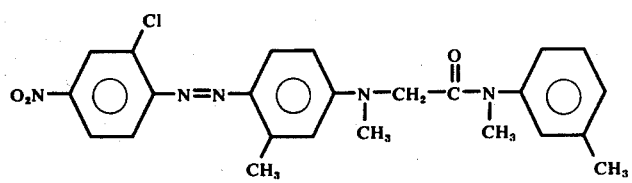
6. Polyester textile material dyed with a dye of claim 1 having the formula:
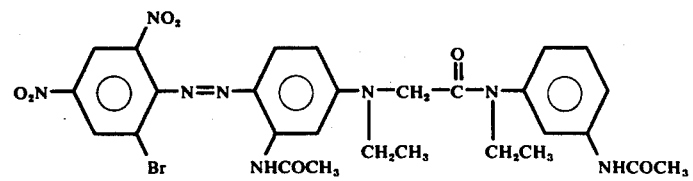
* * * * *